(12) United States Patent
Xu et al.

(10) Patent No.: US 9,467,356 B2
(45) Date of Patent: Oct. 11, 2016

(54) INTEGRATED DATA PLANE FOR HETEROGENEOUS NETWORK SERVICES

(71) Applicant: FutureWei Technologies, Inc., Plano, TX (US)

(72) Inventors: Jun Xu, Cupertino, CA (US); Shree Murthy, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 500 days.

(21) Appl. No.: 13/802,220

(22) Filed: Mar. 13, 2013

(65) Prior Publication Data
US 2014/0269297 A1     Sep. 18, 2014

(51) Int. Cl.
H04L 12/26   (2006.01)
H04L 12/24   (2006.01)
H04L 29/06   (2006.01)
H04L 29/08   (2006.01)

(52) U.S. Cl.
CPC ....... *H04L 41/5054* (2013.01); *H04L 63/0227* (2013.01); *H04L 67/2842* (2013.01)

(58) Field of Classification Search
CPC combination set(s) only.
See application file for complete search history.

(56) References Cited

U.S. PATENT DOCUMENTS

| 2004/0258003 A1* | 12/2004 | Kokot | H04L 12/185 370/254 |
| 2009/0164995 A1* | 6/2009 | Waris | G06F 9/5055 718/100 |
| 2012/0281540 A1* | 11/2012 | Khan et al. | 370/241 |
| 2013/0003736 A1* | 1/2013 | Szyszko | H04L 47/2441 370/392 |
| 2013/0163594 A1* | 6/2013 | Sharma | H04L 45/64 370/392 |

OTHER PUBLICATIONS

Liu, I., et al., "Towards Service Enabled Network Architecture (SENA) Service Directory and Routing in OpenFlow Network," Department of Electrical Engineering, Stanford University. Retrieved Nov. 25, 2015 from http://geyuank.com/POMI/Towards%20Service%20Enabled%20Network%20Architecture_v7.pdf.

* cited by examiner

Primary Examiner — Jutai Kao
(74) Attorney, Agent, or Firm — Slater Matsil, LLP

(57) ABSTRACT

Network services can be dynamically configured on an integrated data path by establishing control paths between data plane entities located on the integrated data path and service entities associated with the network services. In this way, routing for the integrated data path is performed with fewer restrictions than traditional data planes, which are largely limited by the relative locations of pre-configured network nodes in the service network. As a result, the integrated data path may traverse a shorter or more favorable route over the services network, thereby achieving improved service network performance, lower latency periods, less congestion, etc. Further, a service topology on the integrated data path can be dynamically re-configured through the addition, removal, or reordering of data plane entities on the integrated data path.

22 Claims, 11 Drawing Sheets

INTEGRATED DATA PLANE FOR HETEROGENEOUS NETWORK SERVICES

TECHNICAL FIELD

The present invention relates generally to telecommunications, and in specific embodiments to systems and methods for Integrated Data Plane for Heterogeneous Network Services.

BACKGROUND

Enterprise customers often rely on service providers for various network services, such as caching, firewall, routing, intrusion prevention/detection and other services. Traditionally, each network service is statically configured on a different network component. For instance, routing services may be performed at an edge router, transcoding services may be performed at a process server, and media caching services may be performed at a media server. Accordingly, traffic flows requiring multiple network services are often forwarded between multiple network components in the services network. Since each network component has its own data plane, routing/forwarding procedures may be relatively complex for traffic flows requiring multiple network services. Further, forwarding a single traffic flow over multiple legs of the service network may result in significant congestion, which may decrease overall performance of the services network. Accordingly, techniques for reducing complexities associated with routing and forwarding of traffic flows in service networks are desired.

SUMMARY OF THE INVENTION

Technical advantages are generally achieved, by embodiments of this disclosure which describe systems and methods for integrated data plane for heterogeneous network services.

In accordance with an embodiment, a method for providing integrated services on a data plane is provided. In this example, the method includes identifying a traffic flow to be transported over an integrated data path, identifying network services required by the traffic flow, and identifying one or more service entities associated with the network services required by the traffic flow. The integrated data path extends through a plurality of data plane entities. The method further includes configuring the network services on the integrated data path by establishing a control path between each of the one or more service entities and a corresponding one of the plurality of data plane entities. An apparatus for performing this method is also provided.

In accordance with another embodiment, a service network is provided. In this example, the service network includes an integrated data path for transporting a traffic flow, a plurality of data plane entities located on the integrated data path, a first service plane entity, and a second service plane entity. The first service plane entity is associated with a first network service required by the traffic flow, and the second service plane entity is associated with a second network service required by the traffic flow. The first service plane entity is connected to a first one of the plurality of data plane entities via a first control path, and the second service plane entity is connected to a second one of the plurality of data plane entities via a second control path.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of this disclosure provide an integrated data path upon which network services are dynamically configured for individual traffic flows. Unlike traditional data paths, which are routed between statically configured network nodes, aspects of this disclosure provide mechanisms for dynamically configuring network services on data plane entities of the integrated data path. More specifically, a network service is dynamically configured on a data plane entity by establishing a control path between the data plane entity and a service entity associated with the network service. In this way, routing for the integrated data path may be performed with fewer restrictions than traditional data planes, which are largely limited by the relative locations of pre-configured network nodes in the service network. As a result, the integrated data path may traverse a shorter or more favorable route over the services network, thereby achieving improved service network performance, e.g., lower latency periods, less congestion, etc. Further, separate control paths are established for each service entity. Accordingly, the order in which services are provided is dictated by a service topology, which may be dynamically configured/re-configured through the addition, removal, or reordering of data plane entities on the integrated data path.

Figure 1:
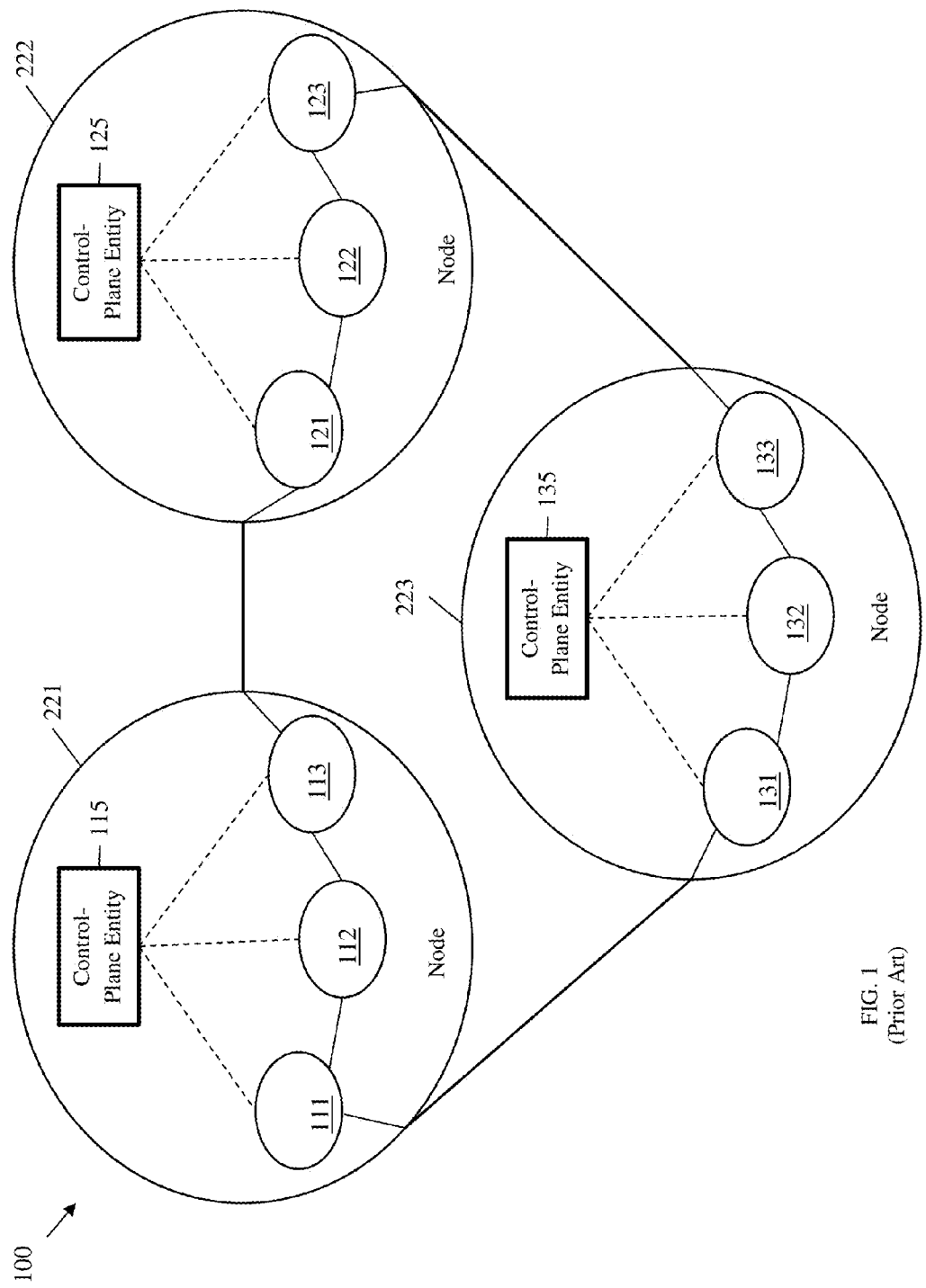
FIG. 1 illustrates a diagram of a conventional network for communicating data.

FIG. 1 illustrates a conventional network architecture 100 comprising a plurality of network nodes 221-223. The network nodes 221-223 may be network appliances configured to provide network services. As an example, the network node 221 provides firewall services, the network node 222 provides caching services, and the network node 223 provides transcoding services. Further and as shown in FIG. 1, each of the network nodes 221-223 include a separate control plane (dashed-line) and data plane (solid-line). More specifically, the network nodes 221, 222, and 223 include control plane entities 115, 125, 135 as well as data plane entities 111-113, 121-123, 131-133. The control plane of the network node 221 extends from the control plane entity to the data plane entities 111, 112, 113, while the data plane of the network node 221 extends between the data plane entities 111, 112, 113. Similarly, in the network node 222, the control plane extends from the control plane entity 125 to the data plane entities 121, 122, 123, while the data plane extends between the data plane entities 121, 122, 123. Likewise, in the network node 223, the control plane extends from the control plane entity 135 to the data plane entities 131, 132, 133, while the data plane extends between the data plane entities 131, 132, 133.

Figure 2A:
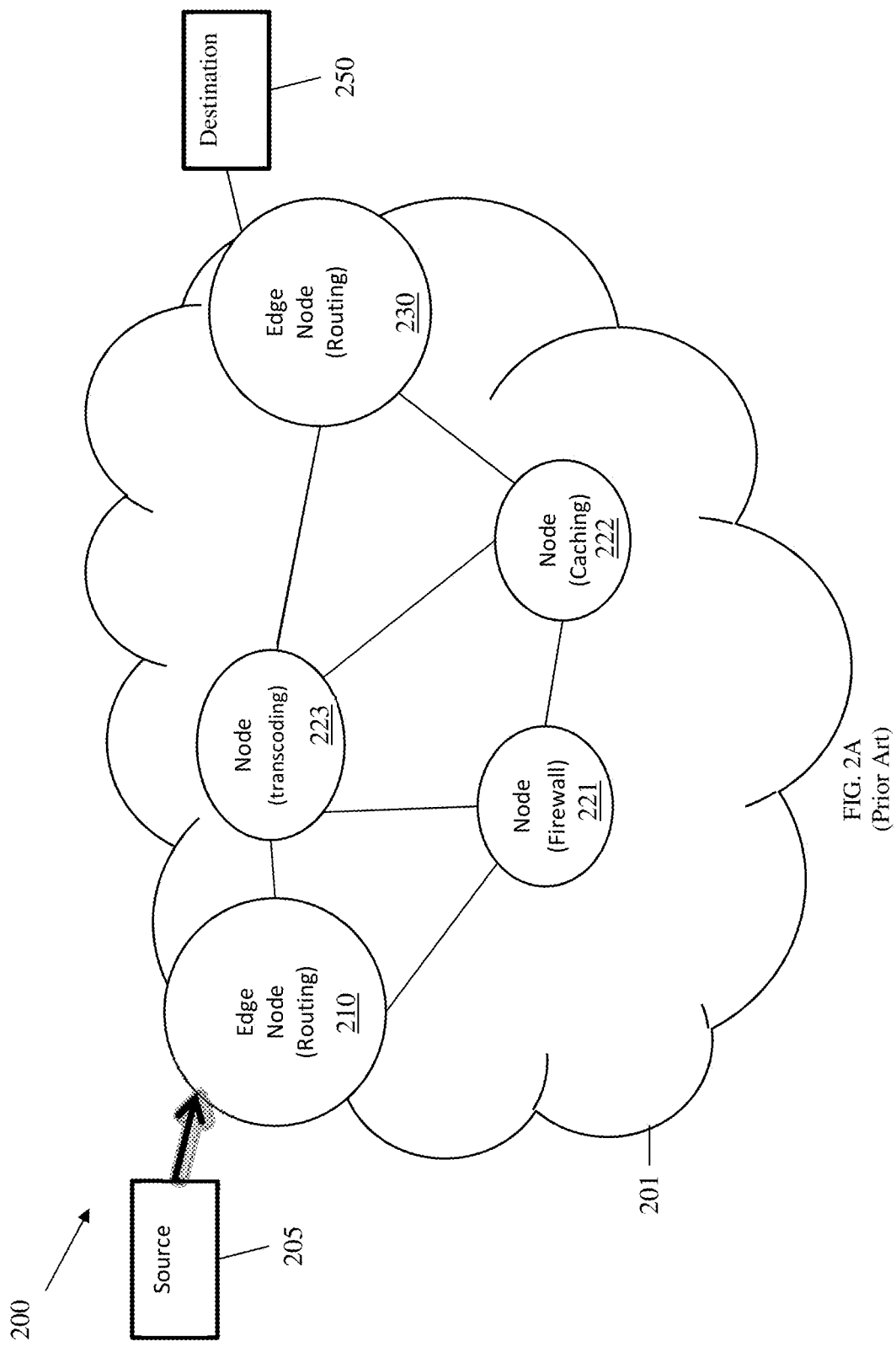
FIGS. 2A-2C illustrate diagrams of a conventional services network.
Figure 2B:
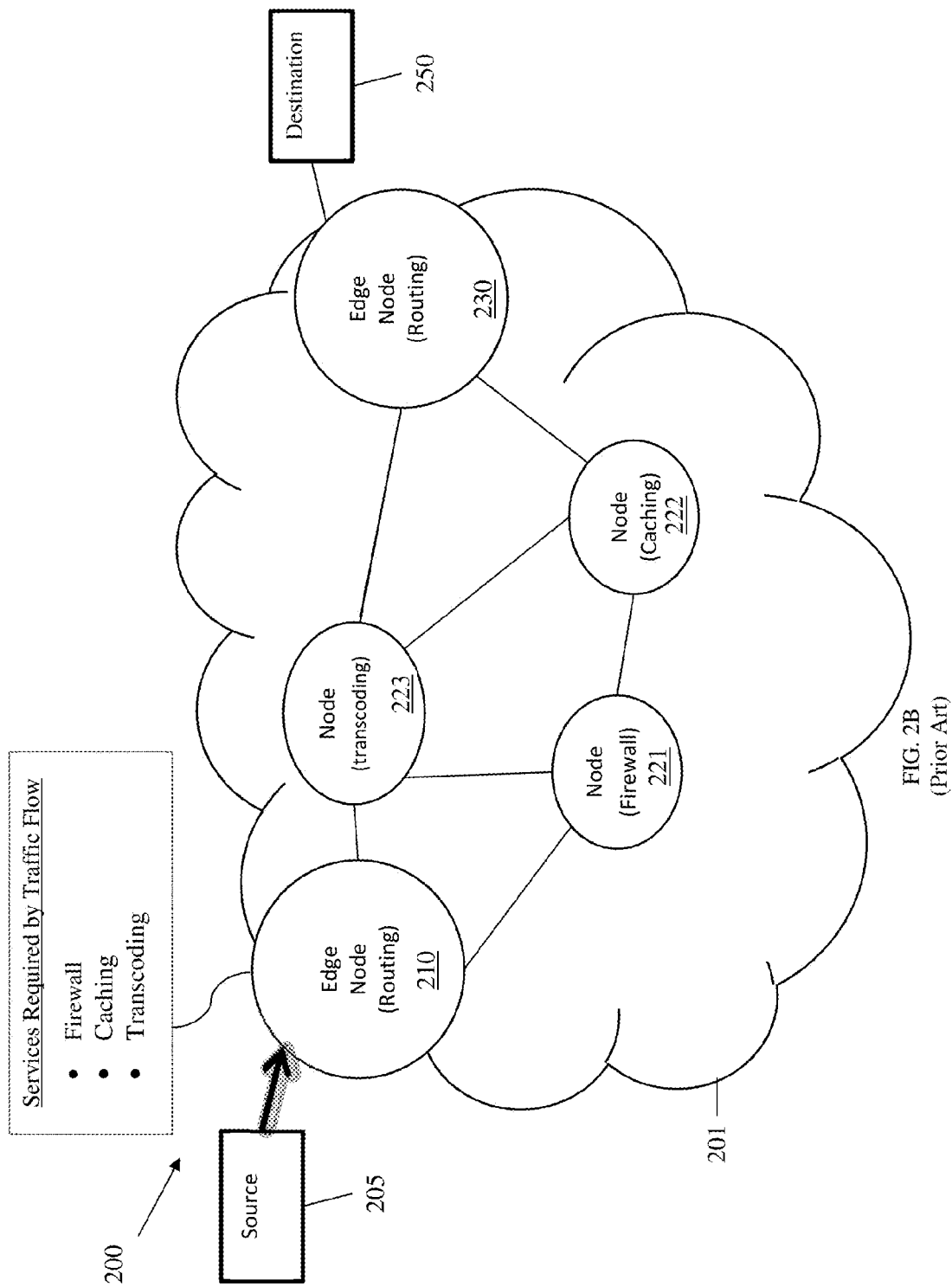
Figure 2C:
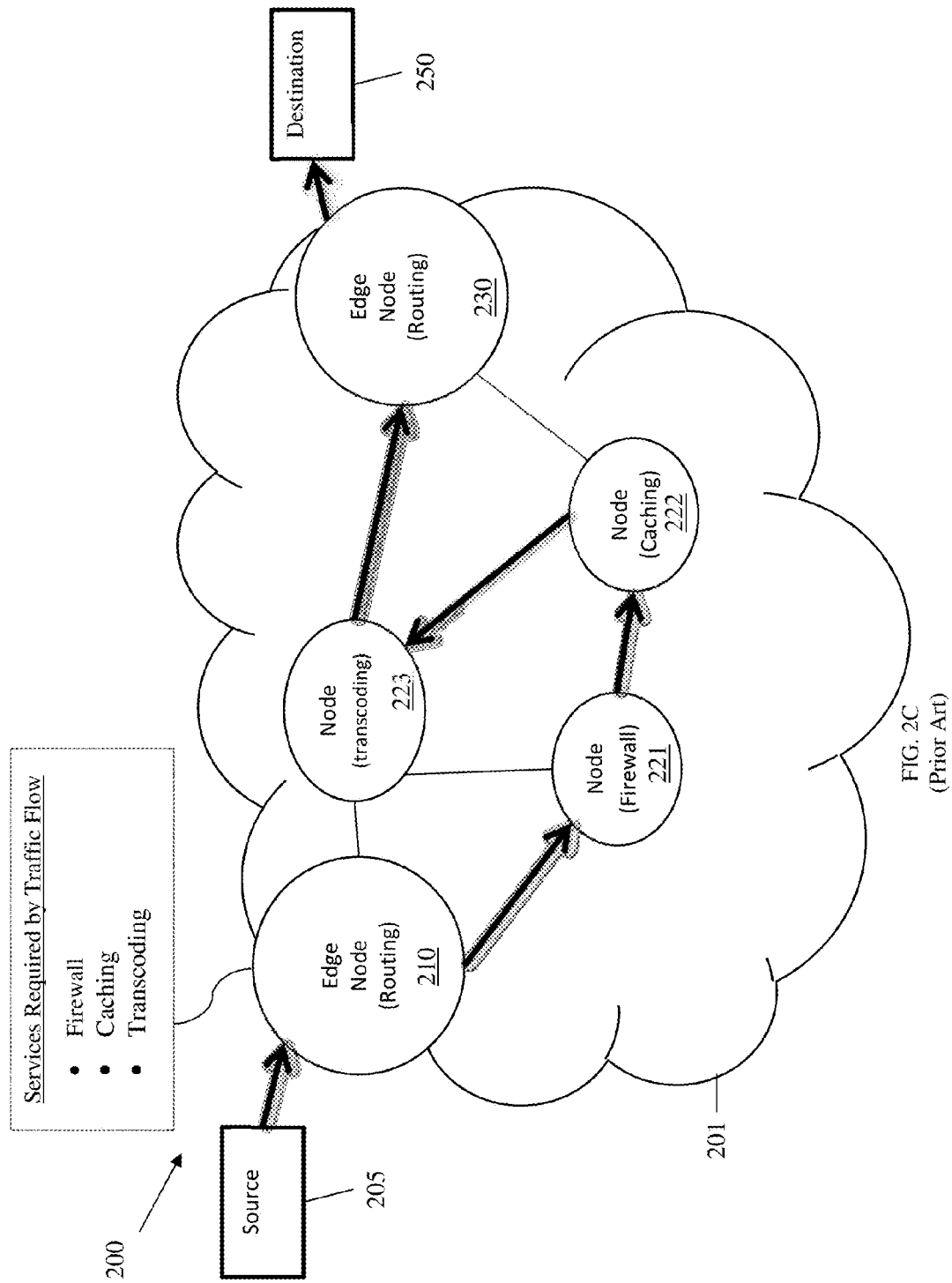

Conventional service networks include network nodes that are statically pre-configured to perform a network service. FIGS. 2A-2C illustrate a conventional network architecture 200 comprising a service network 201 over which a source 205 is configured to communicate traffic to a destination 250. Although shown as separate devices, in some embodiments the source 205 and the destination 250 may be co-located on a common device. As shown, the service network 201 includes a plurality of nodes 210-230, which are pre-configured to provide a given service. More specifically, the edge nodes 210, 230 provide routing services, the node 221 provides firewall services, the node 222 provides caching services, and the node 223 provides transcoding services. The service network 201 may include other nodes (not shown) for providing other services, e.g., antivirus services, email services, etc. As shown in FIG. 2A, the source 205 communicates a traffic flow to the edge node 210. Upon receiving the traffic flow, the edge node 210 determines which services are required by the traffic flow. As shown in FIG. 2B, the edge node 210 determines that the traffic flow requires firewall, caching, and transcoding services. In some embodiments, the services may be required to be performed in a certain order. For instance, it may be necessary or desirable to perform caching prior to transcoding. In any event, the edge node 210 determines a route or path through the network 201 in accordance with the services required by the traffic flow. As shown in FIG. 2C, the path extends from the edge node 210 to the node 221, where a firewall service is provided to the traffic flow. Thereafter, the path extends from the node 221 to the node 222, where a caching service is provided to the traffic flow. Next, the path extends from the node 222 to the node 223, where a transcoding service is provided. Finally, the path extends from the node 223 to the node 230, where the traffic flow is forwarded to the destination 250. As shown, the data path traverses the network 201 along a route that is largely dictated by the relative positions of the nodes 221-223, which are statically configured to perform the services required by the traffic flow. As such, the data path traverses the network 201 in a somewhat indirect manner, which can result in significant contention in the network 201.

Figure 3A:
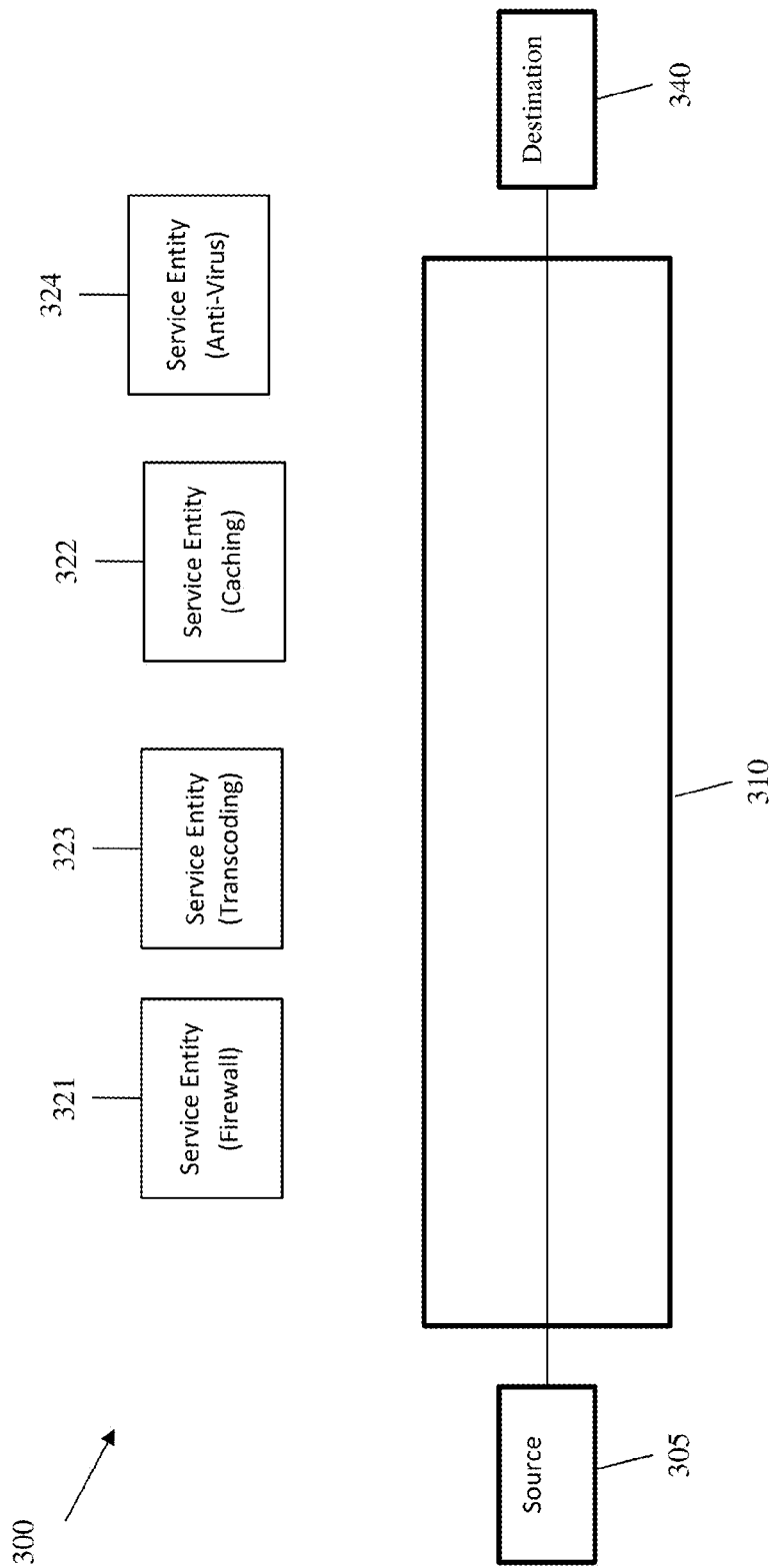
FIGS. 3A-3D illustrate diagrams of an embodiment integrated data path.
Figure 3B:
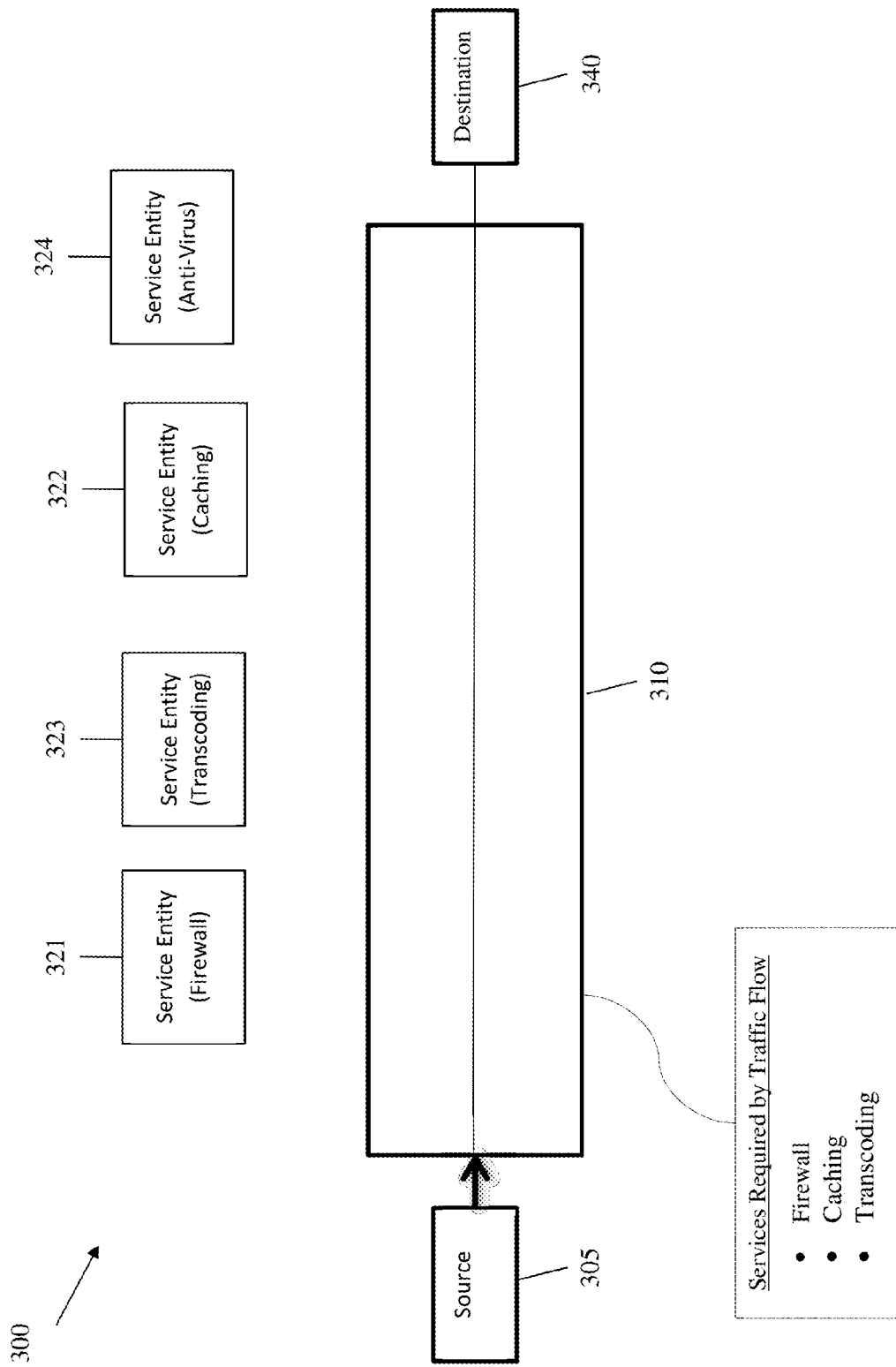
Figure 3C:
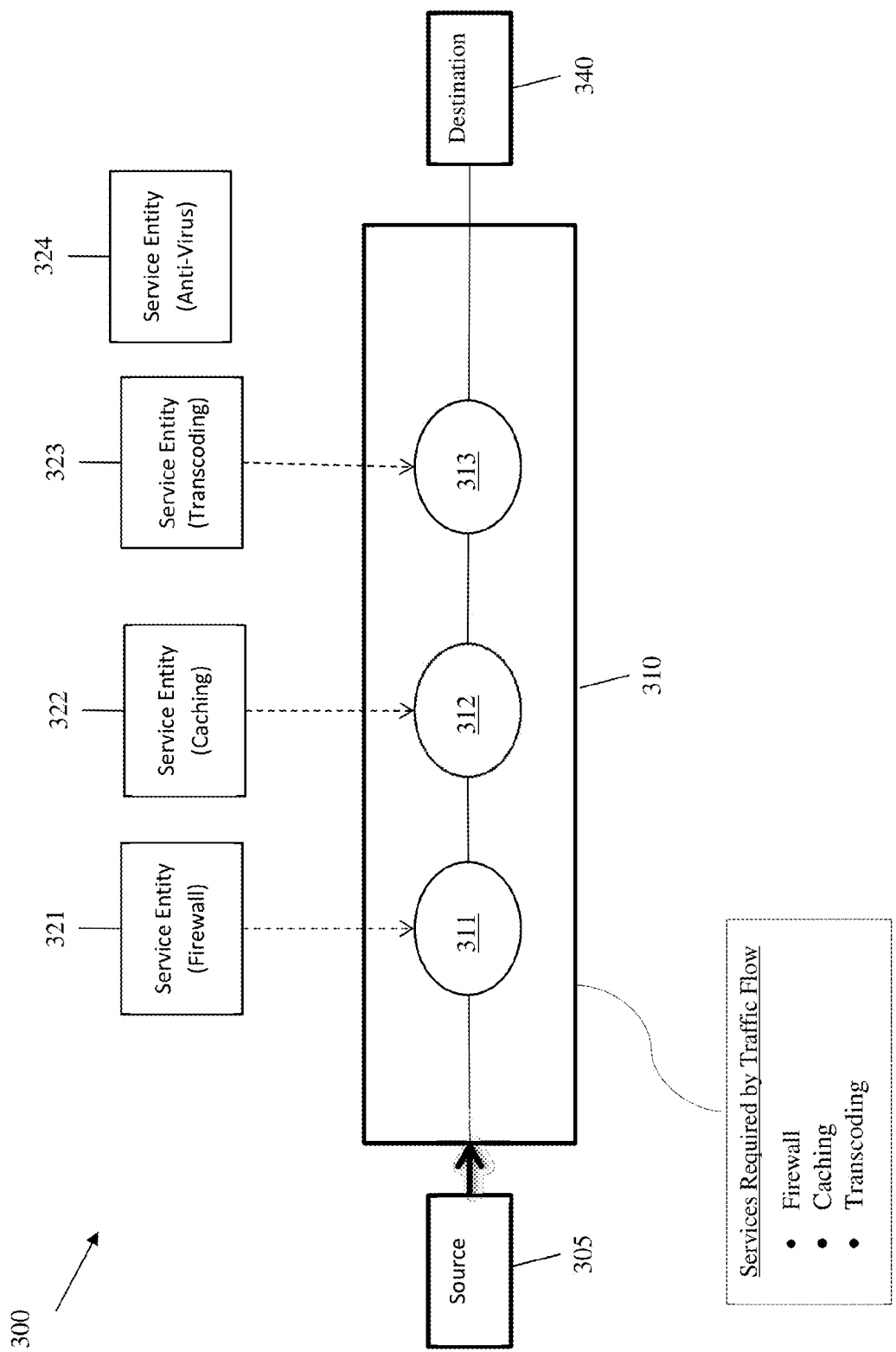
Figure 3D:
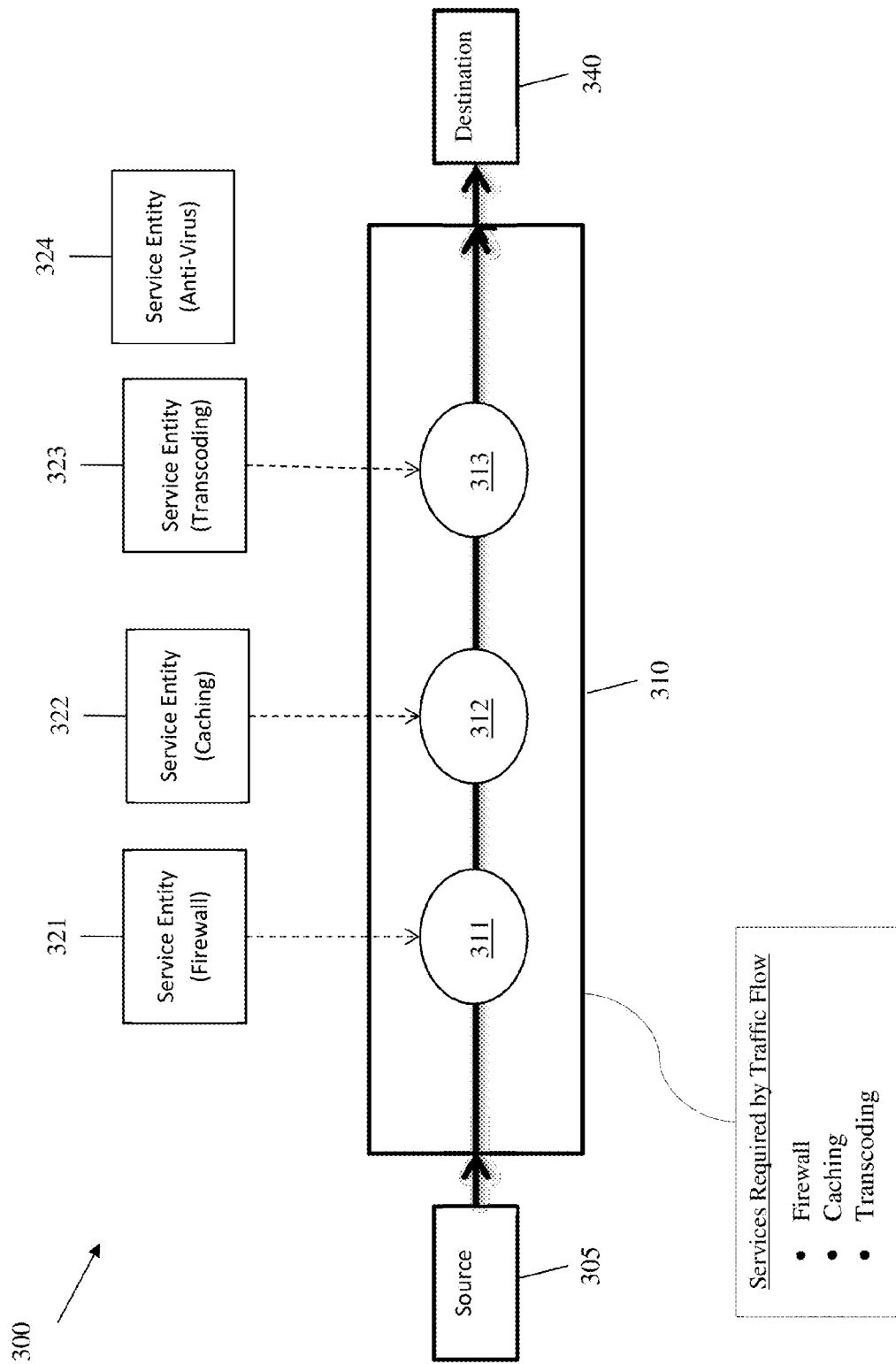

Aspects of this disclosure provide an integrated data path upon which services are dynamically configured. Advantageously, the integrated data path is not bound by the position of statically preconfigured network nodes, and therefore can be routed through the corresponding services network in a direct and/or favorable manner. Indeed, the integrated data path may extend through a single data path element. FIGS. 3A-3C illustrate an embodiment network architecture 300 for communicating data over an integrated data path. As shown, the network architecture 300 includes a data path element 310 over which a source 305 communicates traffic to a destination 340. The data path element 310 may be any network device (e.g., router, server, etc.) that is capable of forwarding data over the integrated data path. In some embodiments, the data path element 310 may be an appliance. As shown in FIG. 3A, the source 305 communicates a traffic flow to the data path element 310. Upon receiving the traffic flow, the data path element 310 determines which services are required by the traffic flow. Alternatively, the data path element 310 may determine which services are required by the traffic flow prior to receiving the traffic flow, as might be the case when the source 305 sends a request or establishment message prior to communicating the traffic flow to the data path element 310. In this example, the data path element 310 determines that the traffic flow requires a firewall service, a caching service, and a transcoding service. Accordingly, as shown in FIG. 3C, the data path element 310 configures the required services on the integrated data path. More specifically, the data path element 310 may locate services entities 321-323 associated with the network services. As shown, the service entity 321 is associated with a firewall service, the service entity 322 is associated with a caching service, and the service entity 323 is associated with a transcoding service. Other service entities may also be available, such as the service entity 324, which is associated with an anti-virus service.

Thereafter, the data path element 310 may configure data plane entities 311, 312, 313 on the integrated data path to perform the firewall, caching and transcoding services by establishing separate control paths with the service entities 321, 322, 323. In some embodiments, the data plane entities 311, 312, 313 already exist on the integrated data path. In other embodiments, the data path element 310 must instantiate (or otherwise create) the data plane entities 311, 312, 313. Once the data plane entities 311, 312, 313 are located/created, the data path element 310 establishes control paths between the data plane entities 311, 312, 313 and the service entities 321, 322, 323. More specifically, the data path element 310 establishes a control path between the service entity 321 and the data plane entity 311, thereby configuring the data plane entity 311 to perform firewall services on the traffic flow transported over the integrated data path. Further, the data path element 310 establishes a control path between the service entity 322 and the data plane entity 312, thereby configuring the data plane entity 312 to perform caching services on the traffic flow transported over the integrated data path. Additionally, the data path element 310 establishes a control path between the service entity 323 and the data plane entity 313, thereby configuring the data plane entity 313 to perform transcoding services on the traffic flow transported over the integrated data path. As shown, the control paths for each service are separate/distinct from one another, while the data path is common/integrated. Hence, the integrated data path may traverse a shorter, more direct path through the network, thereby allowing service networks to more effectively adapt to diverse and/or changing environments. Notably, the order in which the services is configurable through the service topology. For example, locating the service entity 322 ahead of the service entity 323 in the service topology ensures that the caching service will be performed prior to the transcoding service. Further, service entities may be dynamically added to or removed from the network architecture 300. Additionally, one or multiple service entities may interact with the integrated data path at any given time.

Figure 4:
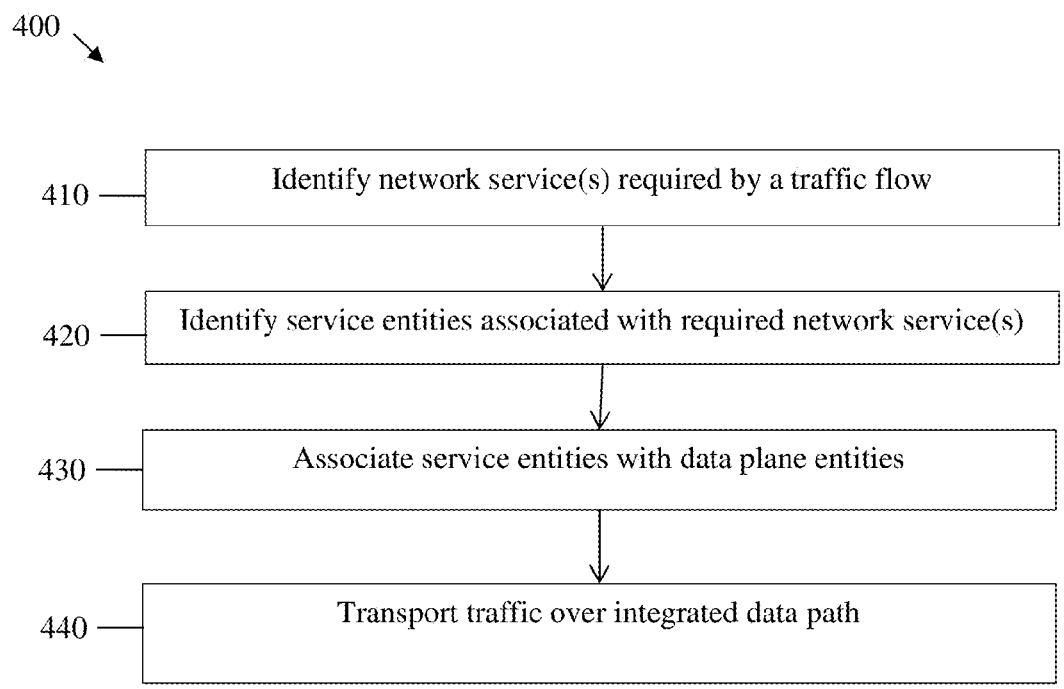
FIG. 4 illustrates a flowchart of an embodiment method for establishing an integrated data path.

FIG. 4 illustrates a method 400 for configuring an integrated data path, as might be performed by data path element, user, administrator, or any other entity associated with or utilizing a services network. The method 400 begins at step 410, where network services required by the traffic flow are identified. Thereafter, the method 400 proceeds to step 420, where services entities associated with the required network services are identified. Next, the method 400 may proceed to step 430, where the identified service entities are associated with data plane entities located on (or instantiated on) the integrated data path. The step 430 may include establishing control paths/lanes between the data plane entities and service entities. Thereafter, the method 400 proceeds to step 440, where the traffic flow is transported over the integrated data path.

Figure 5:
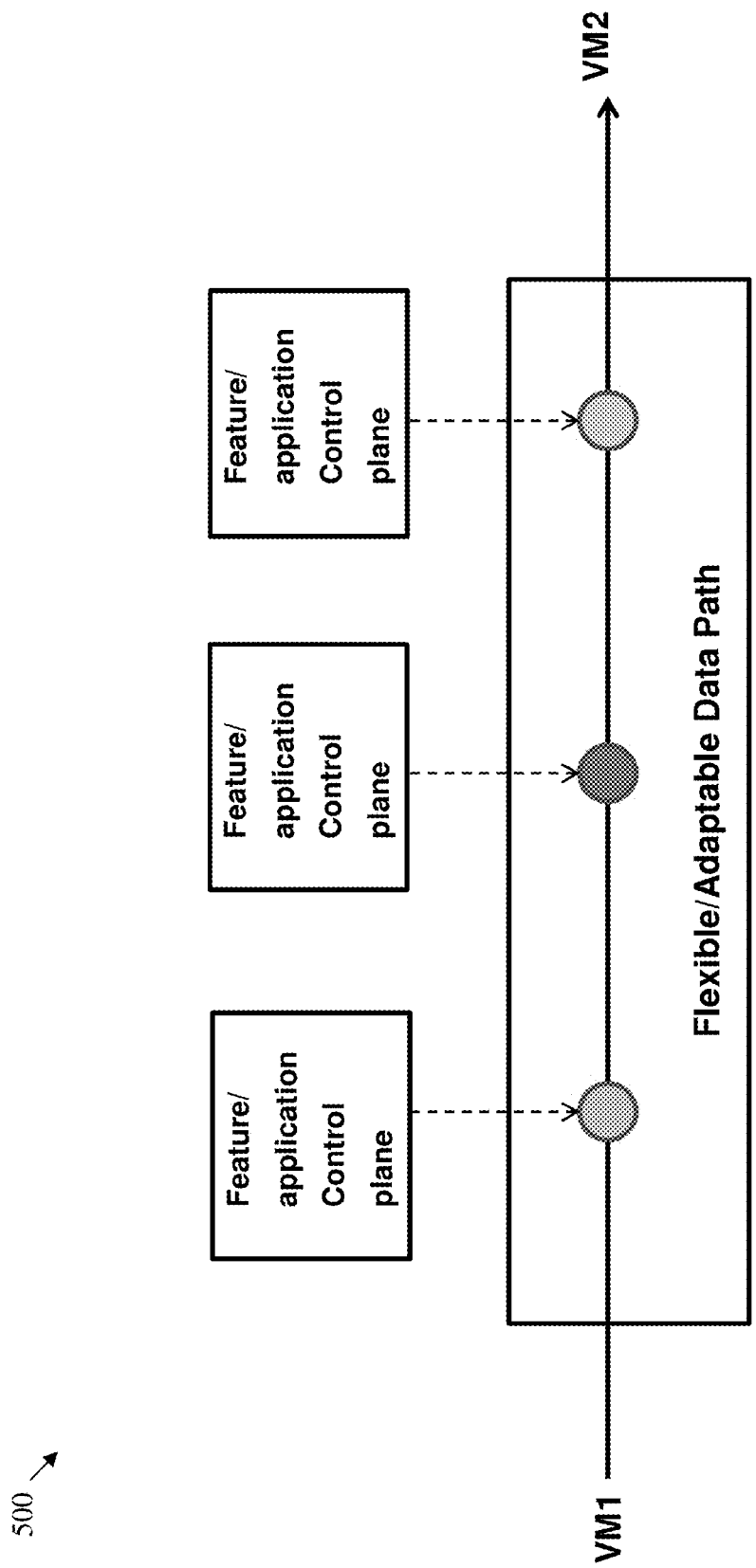
FIG. 5 illustrates a high level block diagram of an integrated data path.

Conventionally, bridging and traffic are simplified through virtualization using an open virtual switch (OVS). However, when external services are enabled, the traffic path may become complicated and/or exhibit low performance. Aspects of this disclosure provide high performance via an integrated data path. Aspects of this disclosure may be applicable for physical/legacy network system as well as a virtualized system. In a physical or virtual system, one unified forwarding/data plane (DP) can present. Besides the basic packet forwarding, the DP is capable of enabling other network services as Firewall, load-balance, Wide Area Application Services (WAAS), IP security (IPsec), App-aware policy, etc. The service may not be enabled by default, and one or more controllers can be configured to enable the services during establishment of the integrated data path. FIG. 5 illustrates a high level block diagram of an integrated data path.

End-to-end traffic might require new services that are not available in a current services network. In such a case, system administrators can locate a compatible controller from the controller depot, and active it in the system. Upon the new controller activation, the DP will use a common method of communication, and the controller will enable the service for the data plane. The traffic flow remain on the data path, rather than being forwarded to the controller. Certain meta-data may pass from service to service, and service order is programmable from a topology/transport layer network instantiation in the system. In some embodiments, legacy network devices may have only one controller, e.g., a homogeneous controller for the DP. Accordingly the integrated data path provided herein can integrate with heterogeneous controllers that have non-contiguous functions.

Figure 6:
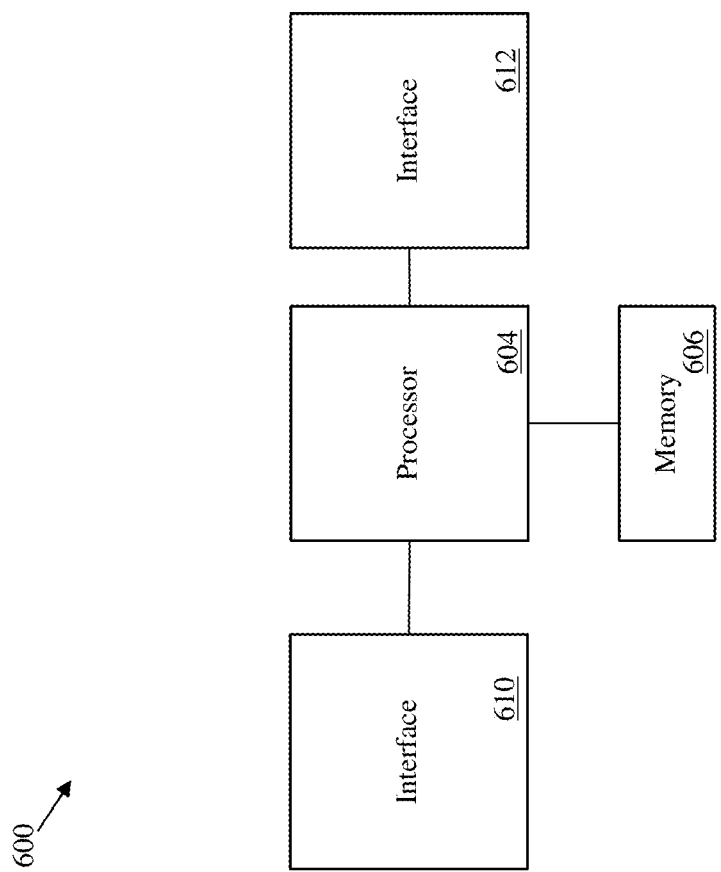
FIG. 6 illustrates a block diagram of an embodiment communications device.

FIG. 6 illustrates a block diagram of an embodiment of a communications device 600, which may be equivalent to one or more devices discussed above. The communications device 600 may include a processor 604, a memory 606, and a plurality of interfaces 610, 612, which may (or may not) be arranged as shown in FIG. 6. The processor 604 may be any component capable of performing computations and/or other processing related tasks, and the memory 606 may be any component capable of storing programming and/or instructions for the processor 604. The interfaces 610, 612 may be any component or collection of components that allows the communications device 600 to communicate with other devices. In an embodiment, the interfaces may be associated with different devices. For instance, the interface 610 may be associated with an external network component, while the interface 612 may be associated with an internal network component. Alternatively, the interfaces may be associated with different communications planes. For instance, the interface 610 may be associated with a data plane, while the interface 612 may be associated with a control plane.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for providing integrated services on a data plane, the method comprising:
identifying a traffic flow to be transported over an integrated data path, the integrated data path extending through a plurality of data plane entities;
identifying network services required by the traffic flow;
identifying one or more service entities associated with the network services required by the traffic flow; and
configuring the network services on the integrated data path for transporting the traffic flow over a network by establishing a control path between each of the one or more service entities and a corresponding one of the plurality of data plane entities, wherein the one or more service entities comprise at least a first service entity associated with a first network service required by the traffic flow, wherein configuring the network services on the integrated data path comprises establishing a first control path between the first service entity and a first data plane entity in the plurality of data plane entities to dynamically configure the first data plane entity to perform the first network service on the traffic flow based on control signaling received over the first control path from the first service entity, wherein the first control path was not established prior to the traffic flow being received by the network, and wherein the first data plane entity was not configured to provide the first network service prior to establishing the first control path between the first data plane entity and the first service entity.

2. The method of claim 1, wherein the one or more service entities further comprise a second service entity associated with a second network service required by the traffic flow.

3. The method of claim 2, wherein configuring the network services on the integrated data path comprises:
establishing a second control path between the second service entity and a second data plane entity in the plurality of data plane entities.

4. The method of claim 3, wherein the second control path is separate from the first control path.

5. The method of claim 3, wherein the first data plane entity is different than the second data plane entity.

6. The method of claim 3, wherein the first network service is different than the second network service.

7. The method of claim 1, wherein the first service entity and the first data plane entity are separate and distinct network components.

8. The method of claim 1, wherein the first control path is established directly between the first service entity and the first data plane entity.

9. The method of claim 1, wherein the first data plane entity is configured to perform the first network service on the traffic flow based on the control signaling without transporting the traffic flow over the first control path.

10. An apparatus comprising:
a processor; and a computer readable storage medium storing programming for execution by the processor, the programming including instructions to:

identify a traffic flow to be transported over an integrated data path, the integrated data path extending through a plurality of data plane entities;

identify network services required by the traffic flow;

identify one or more service entities associated with the network services required by the traffic flow; and configure the network services on the integrated data path for transporting the traffic flow over a network by establishing a control path between each of the one or more service entities and a corresponding one of the plurality of data plane entities, wherein the one or more service entities comprise at least a first service entity associated with a first network service required by the traffic flow, wherein configuring the network services on the integrated data path comprises establishing a first control path between the first service entity and a first data plane entity in the plurality of data plane entities to dynamically configure the first data plane entity to perform the first network service on the traffic flow based on control signaling received over the first control path from the first service entity, wherein the first control path was not established prior to the traffic flow being received by the network, and wherein the first data plane entity was not configured to provide the first network service prior to establishing the first control path between the first data plane entity and the first service entity.

11. The apparatus of claim 10, wherein the first service entity and the first data plane entity are separate and distinct network components.

12. The apparatus of claim 10, wherein the instructions to configure the network services on the integrated data path include instructions to:

establish a second control path between a second service entity and a second data plane entity in the plurality of data plane entities, the second service entity associated with a second network service required by the traffic flow.

13. The apparatus of claim 12, wherein the first control path is separate from the second control path, wherein the first data plane entity is different than the second data plane entity, and wherein the first network service is different than the second network service.

14. The apparatus of claim 10, wherein the first control path is established directly between the first service entity and the first data plane entity.

15. The apparatus of claim 10, wherein the first data plane entity is configured to perform the first network service on the traffic flow based on the control signaling without transporting the traffic flow over the first control path.

16. A method for providing integrated services on a data plane, the method comprising:

identifying a first network service required by a traffic flow;

identifying a first service entity associated with the first network service required by the traffic flow; and configuring the first network service on an integrated data path for transporting the traffic flow over a network by establishing a first control path between the first service entity and a first data plane entity to dynamically configure the first data plane entity to perform the first network service on the traffic flow based on control signaling received over the first control path from the first service entity, wherein the first control path was not established prior to the traffic flow being received by the network, wherein the first data plane entity was not configured to provide the first network service prior to establishing the first control path between the first data plane entity and the first service entity.

17. The method of claim 16, wherein the first service entity and the first data plane entity are separate and distinct network components.

18. The method of claim 16, wherein the first control path is established directly between the first service entity and the first data plane entity.

19. The method of claim 16, wherein the first data plane entity is configured to perform the first network service on the traffic flow based on the control signaling without transporting the traffic flow over the first control path.

20. An apparatus comprising:

a processor; and a computer readable storage medium storing programming for execution by the processor, the programming including instructions to:

identifying a first network service required by a traffic flow;

identify a first service entity associated with the first network service required by the traffic flow; and configure the first network service on an integrated data path for transporting the traffic flow over a network by establishing a first control path between the first service entity and a first data plane entity to dynamically configure the first data plane entity to perform the first network service on the traffic flow based on control signaling received over the first control path from the first service entity, wherein the first control path was not established prior to the traffic flow being received by the network, wherein the first data plane entity was not configured to provide the first network service prior to establishing the first control path between the first data plane entity and the first service entity.

21. The apparatus of claim 20, wherein the first service entity and the first data plane entity are separate and distinct network components.

22. The apparatus of claim 20, wherein the first control path is established directly between the first service entity and the first data plane entity, and wherein the first data plane entity is configured to perform the first network service on the traffic flow based on the control signaling without transporting the traffic flow over the first control path.

* * * * *